Sept. 12, 1950 W. A. COSTELLO 2,521,692
BAFFLE PACKING
Filed Nov. 7, 1946
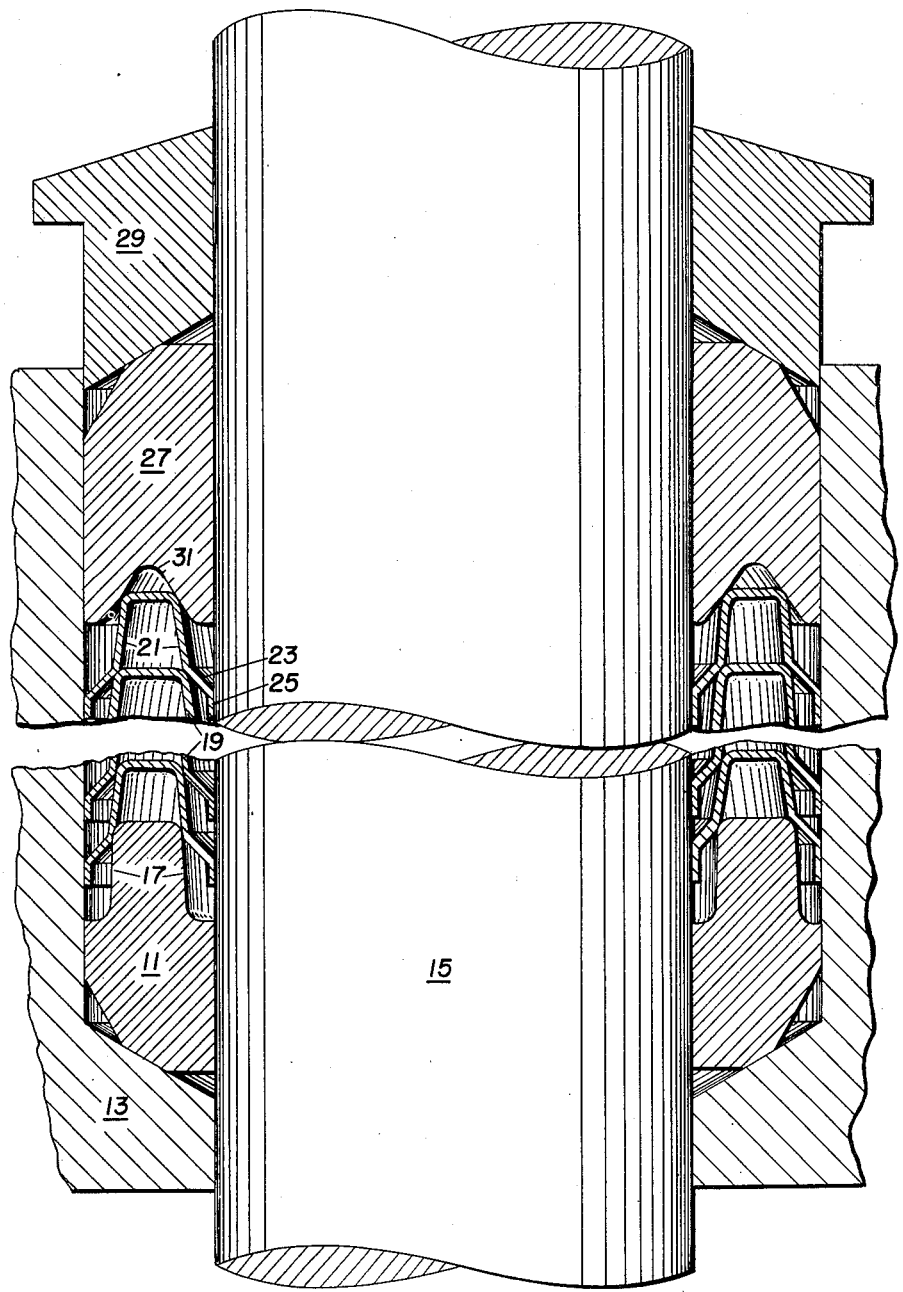
INVENTOR.
WILLIAM A. COSTELLO
BY M. E. Hayes
ATTORNEY Patented Sept. 12, 1950

2,521,692

UNITED STATES PATENT OFFICE 2,521,692

BAFFLE PACKING

William A. Costello, Philadelphia, Pa.

Application November 7, 1946, Serial No. 708,368

5 Claims. (Cl. 286—26)

(Granted under the act of March 3, 1883, as amended April 30, 1928; 370 O. G. 757)

This invention relates to improvements in baffle packing for valve stems; and the objects of the improvement are, first, to provide a durable packing for valve stems; second, to provide a packing that withstands high pressures and temperatures and deters erosion, pitting and abnormal cutting and wear on valve stems; third, to provide a packing that seals off steam or liquid from escape from the valve around the valve stem effectively while permitting normal rotation of said valve stem; fourth, to provide a packing adapted to facilitate lubrication of the valve stem; and fifth, to provide a packing that effects a gradient from the pressure at the base of the valve stem towards atmospheric pressure.

Further objects and advantages of this invention, as well as its construction, arrangement and operation, will be apparent from the following description and claims in connection with the accompanying drawing, in which the single figure is a cross section of the packing space of a straightway valve, showing a preferred embodiment of the invention.

An annular, bottom gland-spacer 11 is seated at the base of the recess defined by the stuffing box 13 of a straightway valve 15, wall portions of said spacer being contiguous to the stem of the valve, the floor of the stuffing box and the inner wall of the said stuffing box respectively. Said bottom gland-spacer is provided with an annular U-shaped flange 17 medial the top thereof and adapted to engage wall portions of a packing ring hereinafter described.

A plurality of packing rings 19, preferably constructed of pressed steel, comprise the packing material. Said packing rings are provided with a U-shaped medial crest or crown having flared wall-portions 21 adapted to seat each of said rings upon the flange 17 of the bottom gland-spacer or upon the flared wall-portion of an adjacent packing-ring, and sharply flared, medial wall-portions 23 and dependent leg-portions 25 adapted to effect contiguity of said leg portions with the valve stem and the inner wall of the stuffing box respectively.

An annular, top gland-spacer 27 is seated upon the distal packing ring, wall portions of said spacer being contiguous to the stem of the valve, the wall of the stuffing box and the gland stud 29 respectively. Said top gland-spacer is further provided with an annular medial groove 31 at the bottom thereof adapted to engage wall portions of the distal packing ring.

When a bottom gland-spacer, a plurality of packing rings and a top gland-spacer are secured in the stuffing box of a valve stem by a gland stud having locking nuts (not shown in the drawing), the force of steam or liquid against the packing ring adjacent the bottom gland spacer exerts a thrust, increasing the stress between the leg portions of said packing rings and the wall of the stuffing box and the valve stem respectively. Such added stress increases the critical pressure at which steam or liquid escapes to the area defined by a superimposed packing ring, so that the pressure in the area defined by the first packing ring is greater than the pressure in the area defined by the packing ring superimposed thereon. Corresponding action with relation to a plurality of superimposed packing rings effect a gradient towards atmospheric pressure.

It is apparent that some condensation of the steam or liquid in the interstices between gland spacers and packing rings and between packing rings occurs. Such condensation lubricates the bearing of the valve stem, facilitating rotation thereof. It is further apparent that the packing employed surpasses conventional fiber and other packings in sealing qualities, durability and resistivity to high temperatures, and that erosion, pitting and abnormal cutting wear on valve stems is retarded by the construction shown.

Various modifications and changes can be made in the above device without departing from the scope of the invention.

The invention described herein may be manufactured and used by or for the Government of the United States of America for governmental purposes without the payment of any royalties thereon or therefor.

I claim:

1. Packing for stuffing boxes of valve stems comprising a first annular gland-spacer having a U-shaped flange medial the top thereof, a plurality of nested packing-rings seated on said gland spacer, each of said packing rings comprising, in cross-section, a U-shaped medial crest having dependent upper wall-portions flared outwardly therefrom, dependent medial wall-portions flared outwardly sharply from said upper wall-portions, and concentric leg-portions disposed normal to the plane of the annulus defined by said ring, said leg portions depending from said medial wall-portions, a second annular gland-spacer having a medial recess in engagement with the crest of the distal packing-ring, and means to secure said gland spacers and said rings in said relation.

2. Packing for stuffing boxes of valve stems comprising a first annular gland-spacer having a U-shaped flange medial the top thereof, a plurality of nested packing-rings of pressed steel seated on said gland spacer, each of said packing rings comprising, in cross-section, a U-shaped medial crest having dependent upper wall-portions flared outwardly therefrom, dependent medial wall-portions flared outwardly sharply from said upper wall-portions, and concentric leg-portions disposed normal to the plane of the annulus defined by said ring, said leg portions depending from said medial wall-portions, a second annular gland-spacer having a medial recess in engagement with the crest of the distal packing ring, and means to secure said gland spacers and said rings in said relation.

3. Packing for stuffing boxes of valve stems comprising a first annular gland-spacer having a U-shaped flange medial the top thereof, a plurality of nested packing-rings seated on said gland spacer, each of said packing rings comprising, in cross-section, a U-shaped medial crest having dependent upper wall-portions flared outwardly therefrom, dependent medial wall-portions flared outwardly sharply from said upper wall-portions, and concentric leg-portions disposed normal to the plane of the annulus defined by said ring, said leg portions depending from said medial wall-portions, each of said packing rings being, in cross-section, of greater height than width, a second annular gland-spacer having a medial recess in engagement with the crest of the distal packing-ring, and means to secure said gland spacers and said rings in said relation.

4. Packing for stuffing boxes of valve stems comprising a first annular gland-spacer having a U-shaped flange medial the top thereof, a plurality of nested packing rings seated on said gland spacer, each of said packing rings comprising, in cross-section, a U-shaped medial crest having relatively long, dependent, upper wall-portions flared outwardly therefrom, relatively short, dependent, medial wall-portions flared outwardly sharply from said upper wall-portions, and concentric leg-portions disposed normal to the plane of the annulus defined by said ring, said leg portions depending from said medial wall-portions, a second annular gland-spacer having a medial recess in engagement with the crest of the distal packing-ring, and means to secure said gland spacers and said rings in said relation.

5. A packing ring for stuffing boxes of valve stems comprising in cross-section, a U-shaped medial crest having dependent upper wall-portions flared outwardly therefrom, dependent medial wall-portions flared outwardly sharply from said upper wall-portions, and concentric leg-portions disposed normal to the plane of the annulus defined by said ring, said leg portions depending from said medial wall portions.

WILLIAM A. COSTELLO.

REFERENCES CITED

The following references are of record in the file of this patent:

UNITED STATES PATENTS

| Number | Name | Date |
|---|---|---|
| 528,773 | Ellis | Nov. 6, 1894 |
| 660,523 | Walker | Oct. 23, 1900 |
| 739,859 | Halsey | Sept. 29, 1903 |
| 1,246,089 | Greenoe | Nov. 13, 1917 |
| 1,771,890 | Hubbard et al. | July 29, 1930 |
| 2,029,598 | Timbs et al. | Feb. 4, 1936 |
| 2,264,147 | Dunlevy | Nov. 25, 1941 |
| 2,420,929 | Buffington et al. | May 20, 1947 |
| 2,430,836 | Taylor | Nov. 11, 1947 |

FOREIGN PATENTS

| Number | Country | Date |
|---|---|---|
| 215,362 | Germany | of 1909 |